(12) United States Patent
Drost et al.

(10) Patent No.: US 7,246,772 B2
(45) Date of Patent: Jul. 24, 2007

(54) ACOUSTIC ABSORPTION SYSTEM FOR AN AIRCRAFT INTERIOR TRIM PANEL SYSTEM

(75) Inventors: Stuart K. Drost, Shelton, CT (US); Jared Luciano Forcier, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 71 days.

(21) Appl. No.: 11/017,281

(22) Filed: Dec. 20, 2004

(65) Prior Publication Data

US 2006/0145004 A1 Jul. 6, 2006

(51) Int. Cl.
*B64C 1/40* (2006.01)

(52) U.S. Cl. .................................... 244/119

(58) Field of Classification Search ............ 244/117 R, 244/119, 133
See application file for complete search history.

(56) References Cited

U.S. PATENT DOCUMENTS

| | | | |
|---|---|---|---|
| 3,221,835 A | 12/1965 | Wenger | |
| 4,340,129 A | 7/1982 | Salyers | |
| 4,456,092 A | 6/1984 | Kubozuka et al. | |
| 4,780,359 A * | 10/1988 | Trask et al. ................. | 442/224 |
| 4,848,514 A | 7/1989 | Snyder | |
| 4,940,112 A | 7/1990 | O'Neill | |
| 5,015,522 A * | 5/1991 | McCullough et al. ..... | 428/312.2 |
| 5,039,567 A | 8/1991 | Landi et al. | |
| 5,175,401 A | 12/1992 | Arcas et al. | |
| 5,198,291 A * | 3/1993 | Kloss, Jr. .................... | 442/397 |
| 5,300,178 A | 4/1994 | Nelson et al. | |
| 5,445,861 A | 8/1995 | Newton et al. | |
| 5,557,078 A | 9/1996 | Holwerda | |
| 5,670,758 A | 9/1997 | Borchers et al. | |
| 5,691,037 A | 11/1997 | McCutcheon et al. | |
| 5,700,527 A | 12/1997 | Fuchs et al. | |
| 5,824,974 A | 10/1998 | Campbell | |
| 6,007,026 A | 12/1999 | Shorey | |
| 6,024,190 A | 2/2000 | Ritzema | |
| 6,158,690 A * | 12/2000 | Wadey et al. ............. | 244/17.27 |
| 6,213,430 B1 | 4/2001 | Spandorf | |
| 6,224,020 B1 | 5/2001 | Hopkins et al. | |
| 6,231,710 B1 | 5/2001 | Herup et al. | |
| 6,260,660 B1 * | 7/2001 | Yoerkie et al. ............. | 181/290 |
| 6,648,100 B2 | 11/2003 | Ebbitt | |
| 6,854,166 B2 * | 2/2005 | Mohammadi ................ | 28/103 |
| 7,040,575 B2 | 5/2006 | Struve et al. | |

* cited by examiner

*Primary Examiner*—Rob Swiatek
(74) *Attorney, Agent, or Firm*—Carlson, Gaskey & Olds

(57) ABSTRACT

An acoustic absorption trim panel includes a composite core, a decoupler layer, and a mass barrier layer. By ensuring that the mass barrier layer remains limp in a limp area but in contact with the composite core through the decoupling layer, damping greater than that imparted in conventional construction is achieved.

21 Claims, 7 Drawing Sheets

ACOUSTIC ABSORPTION SYSTEM FOR AN AIRCRAFT INTERIOR TRIM PANEL SYSTEM

BACKGROUND OF THE INVENTION

The present invention relates to a noise reduction treatment for an aircraft cabin, and more particularly to a lightweight acoustic absorption trim panel system to reduce aircraft interior noise levels.

Noise develops in an aircraft cabin from several sources. The most common sources are internally or externally mounted moving components, such as a transmission, engine or rotor system. Another source of cabin noise is airflow over various aircraft fuselage components. These components may generate vibrations in the aircraft that propagate through the airframe and radiate into the cabin.

Noise may be a particular problem in rotary wing aircraft cabins since the rotor and transmission systems produce a significant amount of vibration directly into the airframe structure. This problem may be more pronounces in rotary wing aircraft than in fixed wing aircraft inasmuch as the dynamic components on a rotary wing aircraft are mounted directly above the cabin.

The main noise problem in helicopter cabins is mid to high frequency gear whine noise from the main transmission. This results in cabin noise vibrations typically from about 350 Hz through 4,000 Hz. In contrast, noise vibrations from the main and tail rotor sources are in the 20 Hz to 125 Hz range and are attenuated by up to 40+ dB by the response of the human ear.

Aircraft cabin interiors are generally designed to maintain aircraft interior noise below a certain level predetermined by competitive pressures in the marketplace. For example, executive transport rotary wing aircraft typically provide a design average noise level limit with the environmental control system (fans, vent air and cooling/heating system) turned off of approximately 75 dB SIL4. The SIL4 (Speech Interference Level 4) noise measurement metric is the arithmetic average of the sound pressure levels in the 500, 1000, 2000 and 4000 Hz octave bands. It rates steady noise according to interference with conversation between two people.

Various conventional acoustic absorption systems have been provided to reduce noise levels within the cabin to below desired SIL4 values. One current method of damping includes mounting interior trim panels within the aircraft cabin. More specifically, the interior trim panel includes Kevlar skins, a layer of Nomex honeycomb core, a layer of polymer isolation/damping, another layer of Nomex honeycomb core and Kevlar skins. Such interior trim panel damping system offers minimal damping properties for the weight penalty incurred and may be relatively difficult and expensive to manufacture.

Accordingly, it is desirable to provide an effective, lightweight, acoustic absorption trim panel system that imparts not only damping but offers enhanced acoustic transmission loss properties, improved acoustic absorption, vibration isolation/decoupling and increased thermal/burn through protection.

SUMMARY OF THE INVENTION

An acoustic absorption trim panel according to the present invention includes a composite core cabin interior panel, a decoupler layer, and a mass barrier layer. The composite core cabin interior panel defines the outer aesthetic surface visible by a passenger within the aircraft cabin. The decoupler layer is a high loft decoupling material such as felted Nomex. The mass barrier layer is mounted to the composite core cabin interior pane1 to at least partially surround the decoupler layer. The mass barrier layer is manufactured of vinyl which is mass loaded with barium sulfate powder. By ensuring that the mass barrier layer remains limp in a limp area but in contact with the composite core cabin interior panel through the decoupling layer, damping greater than that imparted in conventional construction is achieved. The damping of the present invention is achieved without incurring excessive weight penalty or expense.

The acoustic absorption trim panel increases vibration damping to minimize the transfer of structureborne vibration into the cabin as noise; increases acoustic attenuation; increases acoustic absorption; increases vibration decoupling to minimize the transfer of structureborne vibration into the cabin as noise through incidental contact; and enhances thermal and burn through protection by the incorporation of low flammability and low moisture absorbing materials.

The present invention therefore provide an effective, lightweight, acoustic absorption trim panel system that imparts not only damping but offers enhanced acoustic transmission loss properties, improved acoustic absorption, vibration isolation/decoupling and increased thermal/burn through protection.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
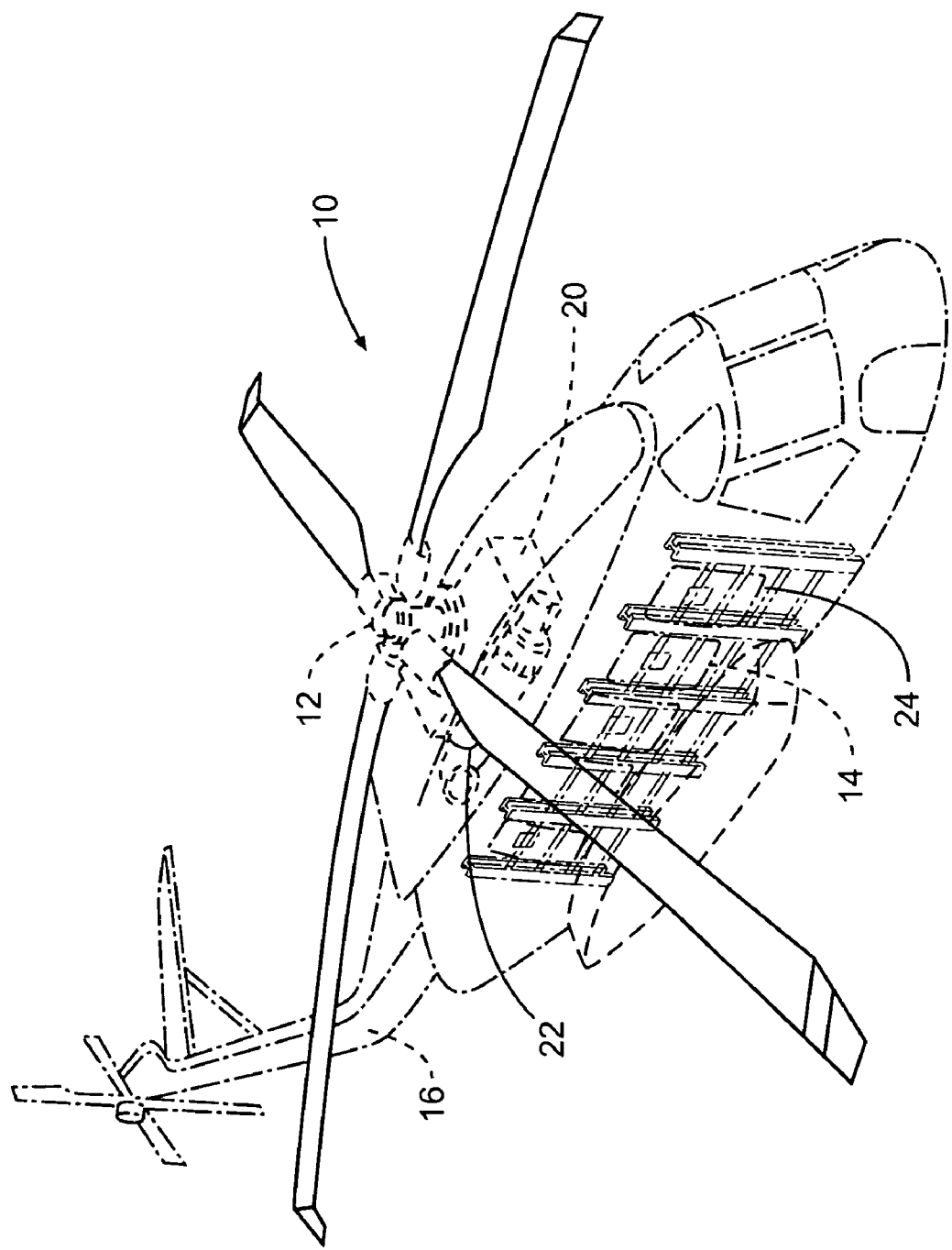
FIG. 1 is a general perspective view an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven through a transmission (illustrated schematically at 20) by one or more engines 22. Although a particular helicopter configuration is illustrated in the disclosed embodiment, other machines such as turbo-props, tilt-rotor and tilt-wing aircraft will also benefit from the present invention.

Figure 2:
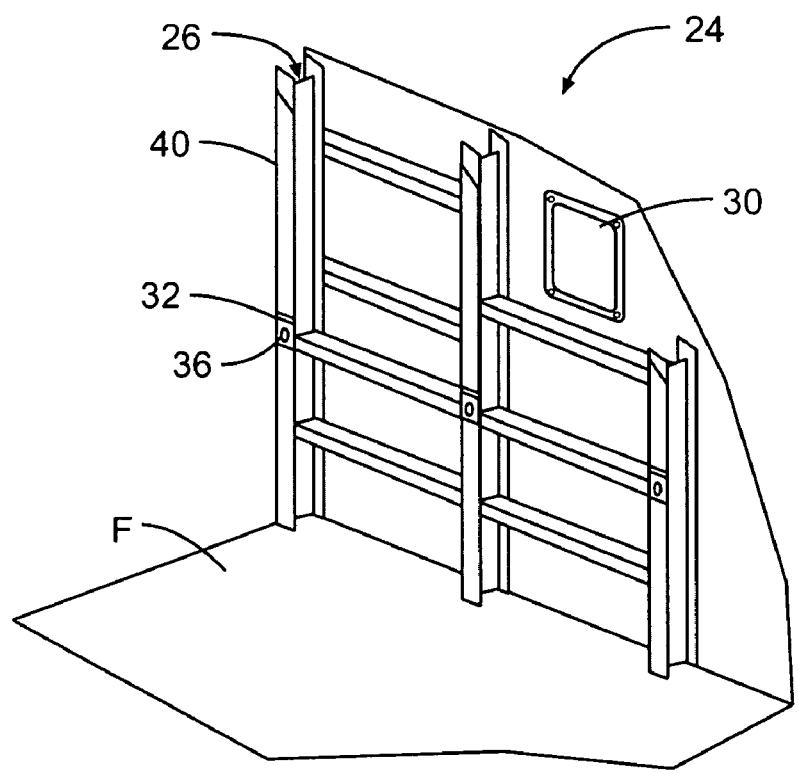
FIG. 2 is a plan view of an airframe section for use with an acoustic absorption trim panel of the present invention.

Referring to FIG. 2, an airframe section 24 includes a multitude of frame members 26 which support an outer skin 28. The airframe section 24 is the outer structure of the aircraft 10 and may include one or more window areas 30. The window areas 30 are typically located through the outer skin 28 between the multitude of frame members 26. The multitude of frame members 26 are typically arranged in a rectilinear pattern, however, any arrangement may be used with the present invention.

Figure 3:
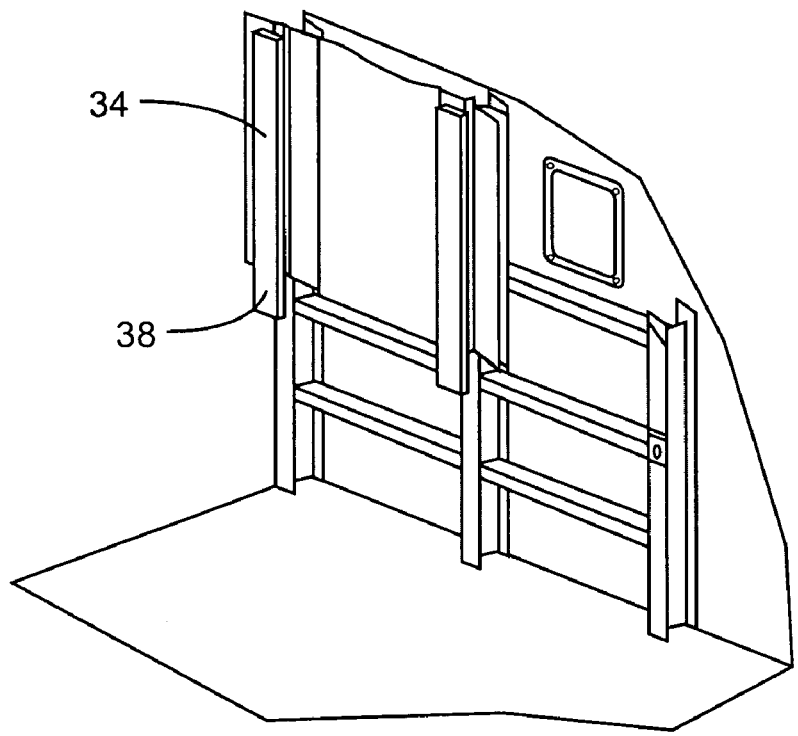
FIG. 3 is a plan view of an airframe section with a multitude of frame members with an interior skeleton structure attached thereto.

The multitude of frame members 26 includes a multitude interior skeleton mounts 32 which support an interior skeleton structure 34 (FIG. 3). The interior skeleton mounts 32 preferably include posts 36 to receive corresponding receivers 38 located in the interior skeleton structure 34 such that the interior skeleton structure 34 essentially "snaps" in place. The interior skeleton structure 34 is preferably manufactured of composite materials. The interior skeleton structure 34 provides support and attachment for a multitude of acoustic absorption trim panels 40 (FIG. 4) through fasteners such as quarter turn fasteners or the like.

Figure 5:
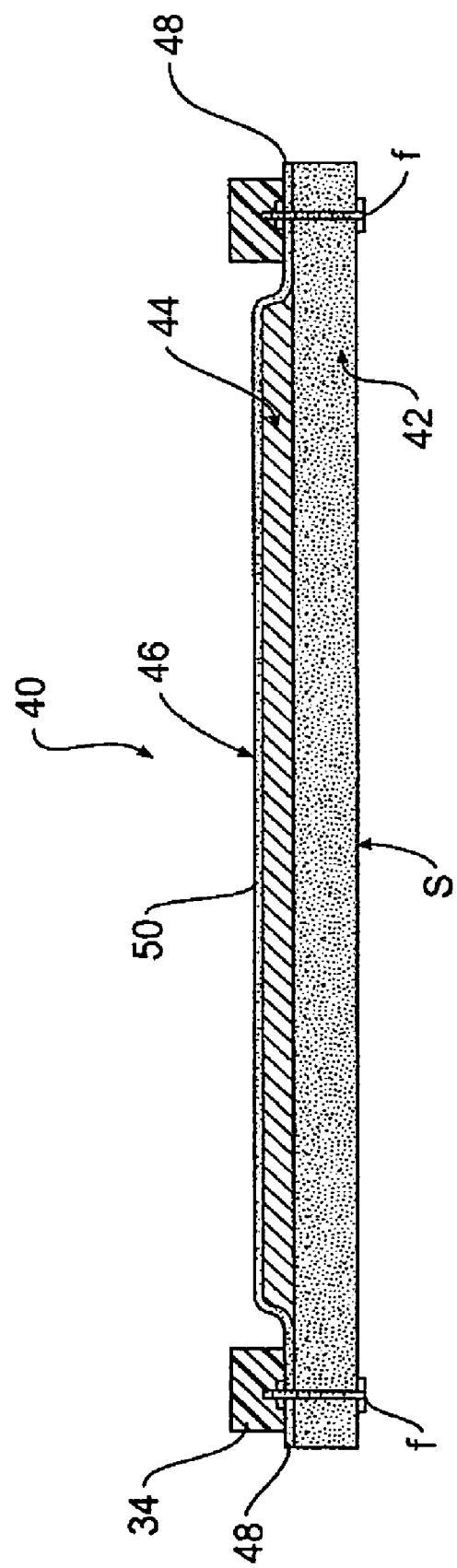
FIG. 5 is a sectional view of an acoustic absorption trim panel of the present invention.

Referring to FIG. 5, an acoustic absorption trim panel 40 includes a composite core cabin interior panel 42, a decoupler layer 44, and a mass barrier layer 46.

Figure 4:
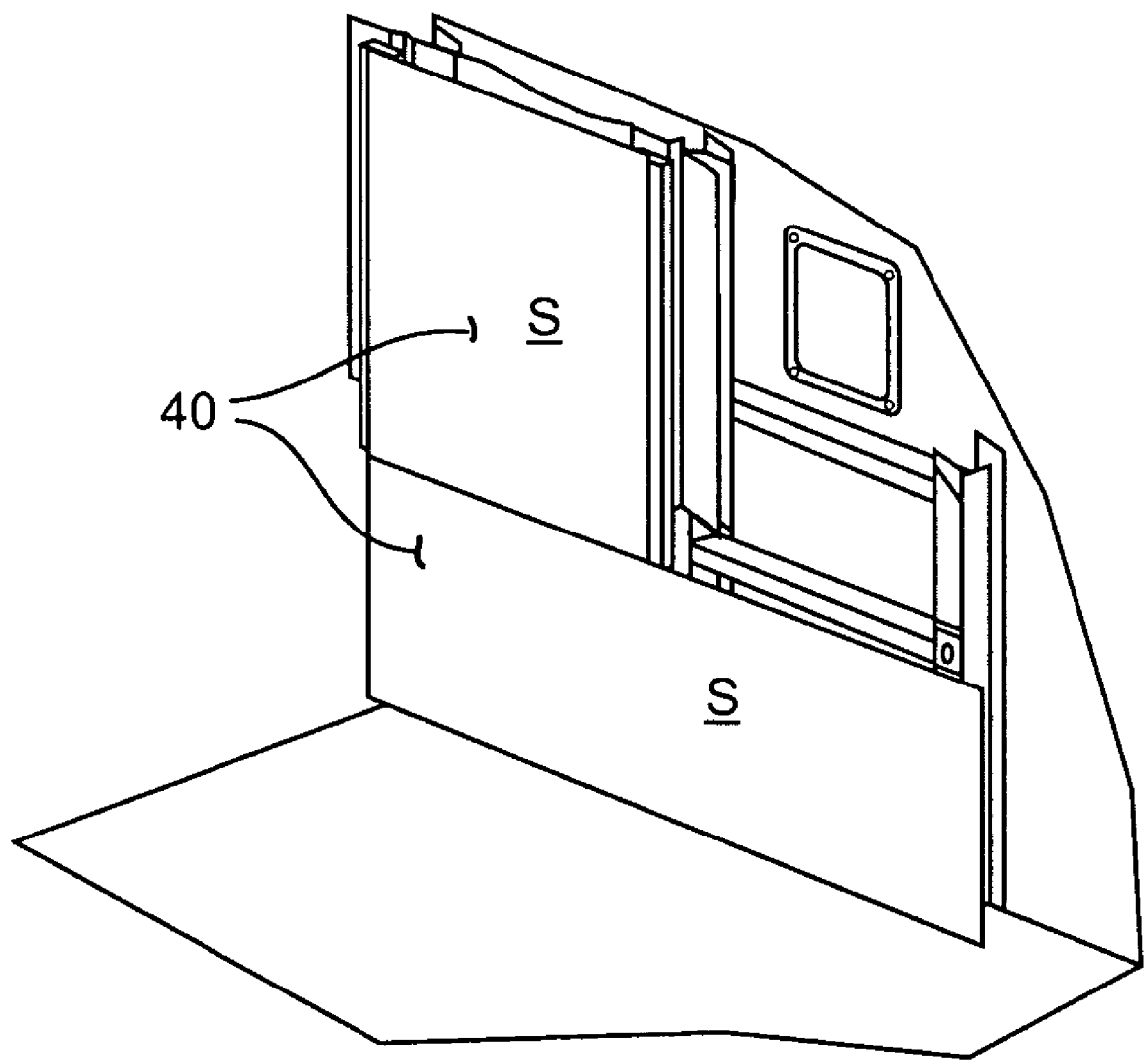
FIG. 4 is a plan view of an interior skeleton structure having acoustic absorption trim panel of the present invention attached thereto.

The composite core cabin interior panel 42 defines the outer aesthetic surface S visible by a passenger within the aircraft cabin (also illustrated in FIG. 4). Testing revealed that the weight, strength and acoustic attenuation differences between Fiberglass, Kevlar and Carbon Fiber did not greatly influence the choice of cores. Skin choice however became important when attempts were made to incorporate damping. Because stiffness of materials plays an important role in vibration resonance damping, the amount of imparted damping increased and the damping application weight decreased when applied to fiberglass core.

Figure 6A:
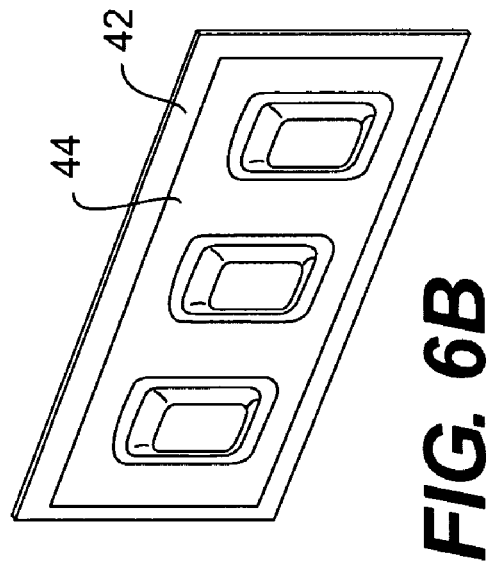
FIG. 6A is a perspective view of a first layer of an acoustic absorption trim panel of FIG. 5.
Figure 6B:
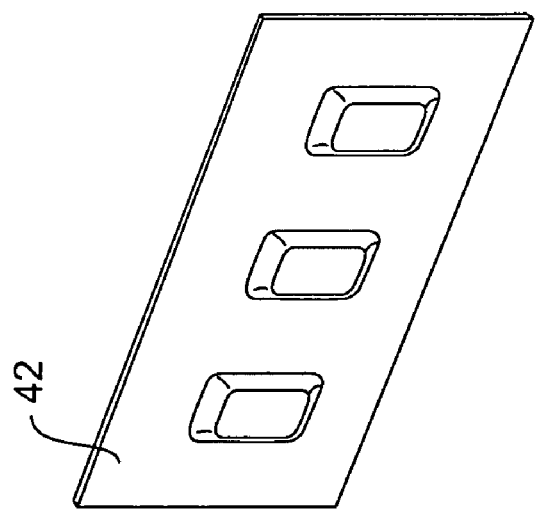
FIG. 6B is a perspective view of a first layer and a second layer of the acoustic absorption trim panel of FIG. 5.

The decoupler layer 44 is preferably a high loft decoupling material such as felted Nomex. The decoupler layer 44 is located adjacent the composite core cabin interior panel 42. The decoupler layer 44 is preferably adhered to the composite core cabin interior panel 42 (FIG. also illustrated in FIG. 6B).

The mass barrier layer 46 is mounted to the composite core cabin interior panel 42 to at least partially surround the decoupler layer. The mass barrier layer 46 is preferably made from virgin (high grade) vinyl which is mass loaded with barium sulfate powder, or similar dense material to increase its mass, and has a thickness of approximately $\frac{1}{16}$ to $\frac{1}{4}$ inches. While vinyl is the preferred material because of its limpness, high inherent damping and relatively high density, the mass barrier layer 46 can be made from a variety of alternate materials, such as silicone or rubber sheet material. The materials used are selected on the basis of limpness, lowest stiffness, high relative surface density, resistance to fire, low levels of toxic fume emission when exposed to flame, expense, etc.

Figure 6C:
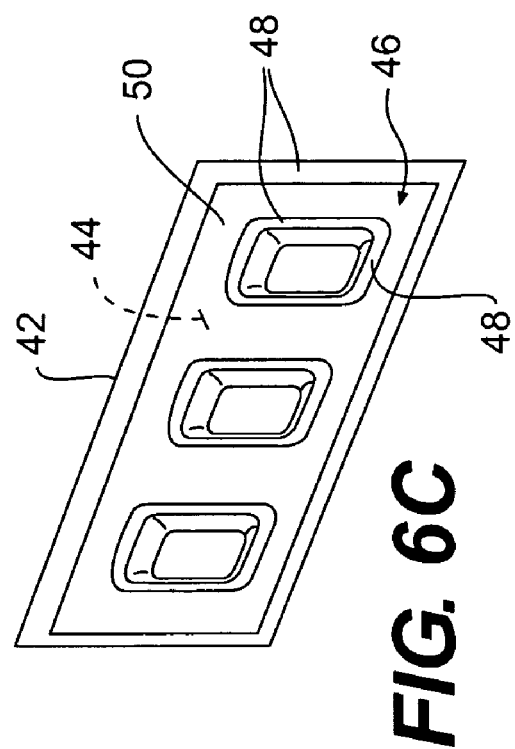
FIG. 6C is a perspective view of a first layer, a second layer and a third layer of the acoustic absorption trim panel of FIG. 5.

The mass barrier layer 46 includes an attachment area 48 which is adhered to the composite core cabin interior panel 42 and a limp area 50 which is adjacent the decoupler layer 44 (also illustrated in FIG. 6C). The limp area 50 is generally parallel to the composite core cabin interior panel 42 to sandwich the decoupler layer 44 therebetween. By ensuring that the mass barrier layer 46 remains limp in the limp area 50 but in contact with the composite core cabin interior panel 42 through the decoupling layer 44, damping greater than that imparted in conventional construction is achieved. The damping of the present invention is achieved without incurring excessive weight penalty or expense.

The attachment area 48 provides a more rigid area which permits receives a fastener f therethrough to removably secure the acoustic absorption trim panels 40 to the interior skeleton structure 34 (FIG. 5).

Figure 7A:
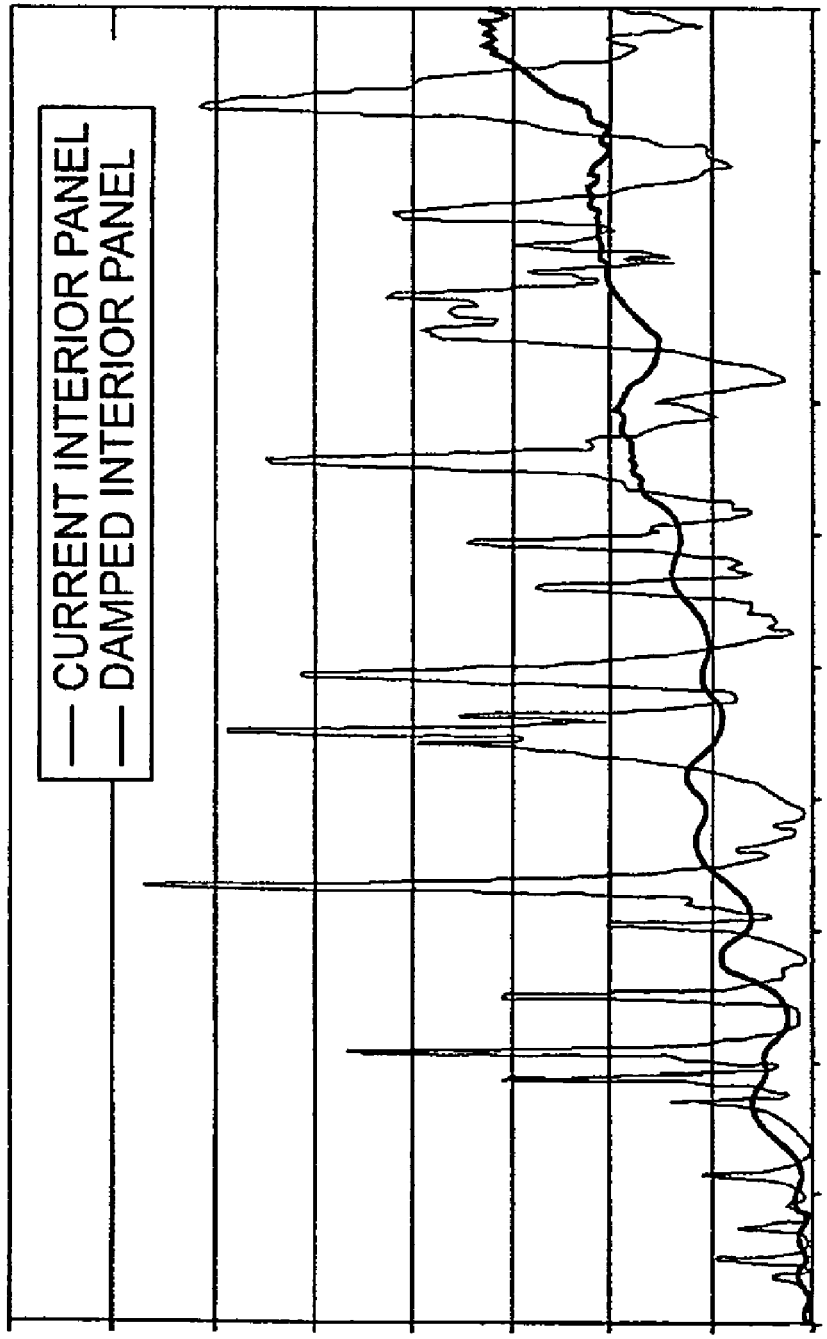
FIG. 7A is a comparison of vibration resonance response between current interior panels and panels manufactured in accordance with the present invention.
Figure 7B:
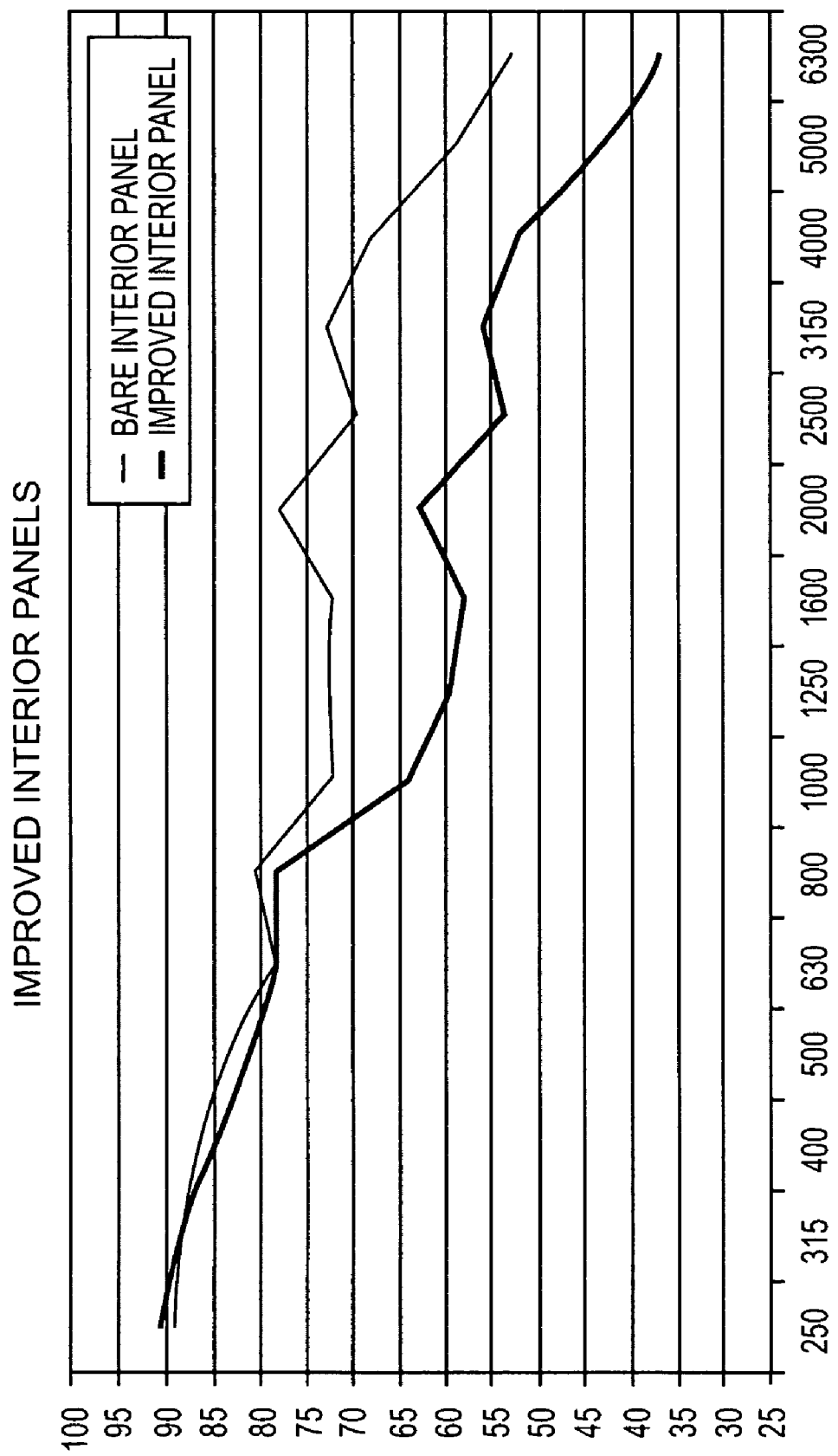
FIG. 7B is a comparison of acoustic attenuation between a bare interior panel and panels manufactured in accordance with the present invention.

Referring to FIGS. 7A and 7B, the effect of a trim panel manufactured in accordance with the present invention is illustrated in graphic format. FIG. 7A is a comparison of vibration resonance response between current interior panels and panels manufactured in accordance with the present invention. FIG. 7B is a comparison of acoustic attenuation between a bare interior panel and a trim panel manufactured in accordance with the present invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An acoustic absorption trim panel assembly comprising:
   a composite core cabin interior panel;
   a decoupler layer adjacent said composite core cabin interior panel; and
   a mass barrier layer attached to said composite core cabin interior panel at an attachment area to define a limp area adjacent said decoupler layer.

2. The acoustic absorption trim panel assembly as recited in claim 1, wherein said composite core cabin interior panel includes a Kevlar material.

3. The acoustic absorption trim panel assembly as recited in claim 1, wherein said composite core cabin interior panel includes a fiberglass material.

4. The acoustic absorption trim panel assembly as recited in claim 1, wherein said composite core cabin interior panel includes a carbon fiber material.

5. The acoustic absorption trim panel assembly as recited in claim 1, wherein said decoupler layer includes a high loft felted nomex.

6. The acoustic absorption trim panel assembly as recited in claim 1, wherein said mass barrier layer includes a vinyl which is mass loaded with a barium sulfate powder.

7. The acoustic absorption trim panel assembly as recited in claim 1, wherein said mass barrier layer is attached to said composite core cabin interior panel to sandwich said decoupler layer between said composite core cabin interior panel and said mass barrier portion.

8. The acoustic absorption trim panel assembly as recited in claim 1, wherein said mass barrier layer portion includes a multitude of attachment areas at which said mass barrier layer is adhered to said composite core cabin interior panel, said limp area separate from said multitude of attachment areas.

9. The acoustic absorption trim panel assembly as recited in claim 1, wherein said mass barrier layer is at least partially spaced away from said composite core cabin interior panel and in contact with said decoupler layer within said limp area.

10. The acoustic absorption trim panel assembly as recited in claim 1, wherein said composite core cabin interior panel is of a relatively rigid material.

11. The acoustic absorption trim panel assembly as recited in claim 1, wherein said composite core cabin interior panel defines an outer aesthetic surface visible from within an aircraft cabin.

12. The acoustic absorption trim panel assembly as recited in claim 1, wherein said mass barrier layer is attached to said composite core cabin interior panel at said attachment area such that said decoupler layer is movable independent of said composite core cabin interior panel within said limp area.

13. An airframe section comprising:
a multitude of frame members;
an outer skin attached to said multitude of frame members;
an interior skeleton structure attached to said multitude of frame members;
an acoustic absorption trim panel assembly attachable to said interior skeleton structure, said acoustic absorption trim panel assembly comprising:
a composite core cabin interior panel;
a decoupler layer adjacent said composite core cabin interior panel; and
a mass barrier layer attached to said composite core cabin interior panel at an attachment area to define a limp area in contact with said decoupler layer separate from said attachment area, said interior trim panel attached to said interior skeleton structure adjacent said attachment area such that said composite core cabin interior panel is outboard of said decoupler layer relative to said interior skeleton structure.

14. The airframe section as recited in claim 13, wherein said limp area defines a space within which said decoupler layer is movable independent of said composite core cabin interior panel and said mass barrier layer.

15. The airframe section as recited in claim 13, wherein said mass barrier layer is at least partially spaced away from said composite core cabin interior panel and in contact with said decoupler layer within said limp area.

16. The acoustic absorption trim panel assembly as recited in claim 13, wherein said mass barrier layer is attached to said composite core cabin interior panel at said attachment area such that said decoupler layer is movable independent of said mass barrier layer within said limp area.

17. A method of acoustic absorption with a trim panel within an aircraft cabin comprising the step of:
(1) attaching a mass barrier layer to a composite core cabin interior panel to at least partially surround a decoupler layer at an attachment area; and
(2) maintaining the mass barrier layer at least partially in contact with the decoupler layer at a limp area separate from the attachment area.

18. A method as recited in claim 17, wherein said step (2) further comprises:
ensuring that the mass barrier layer remains limp but in contact with the composite core cabin interior panel through the decoupler layer in the limp area.

19. A method as recited in claim 17, wherein said step (2) further comprises:
permitting the decoupler layer to be movable independent of the composite core cabin interior panel within the limp area.

20. A method as recited in claim 17, wherein said step (2) further comprises:
permitting the decoupler layer to be movable independent of the mass barrier layer within the limp area.

21. A method as recited in claim 17, wherein said step (2) further comprises:
permitting the decoupler layer to be movable independent of the composite core cabin interior panel and the mass barrier layer within the limp area.

* * * * *